Dec. 13, 1955 — C. R. LUPTON ET AL — 2,726,974
MACHINE FOR BONDING LINING TO A BRAKE SHOE
Filed Aug. 3, 1949 — 4 Sheets-Sheet 1

INVENTORS
CLARK R. LUPTON
C. WAYNE TRAUTMAN
WILLIAM H. WEBER
BY G. A. Gust
ATTORNEY Dec. 13, 1955  C. R. LUPTON ET AL  2,726,974
MACHINE FOR BONDING LINING TO A BRAKE SHOE
Filed Aug. 3, 1949  4 Sheets-Sheet 2

INVENTORS
CLARK R. LUPTON
BY C. WAYNE TRAUTMAN
WILLIAM H. WEBER
G. A. Gust
ATTORNEY INVENTORS
CLARK R. LUPTON
C. WAYNE TRAUTMAN
WILLIAM H. WEBER
BY
*G. A. Gust*
ATTORNEY

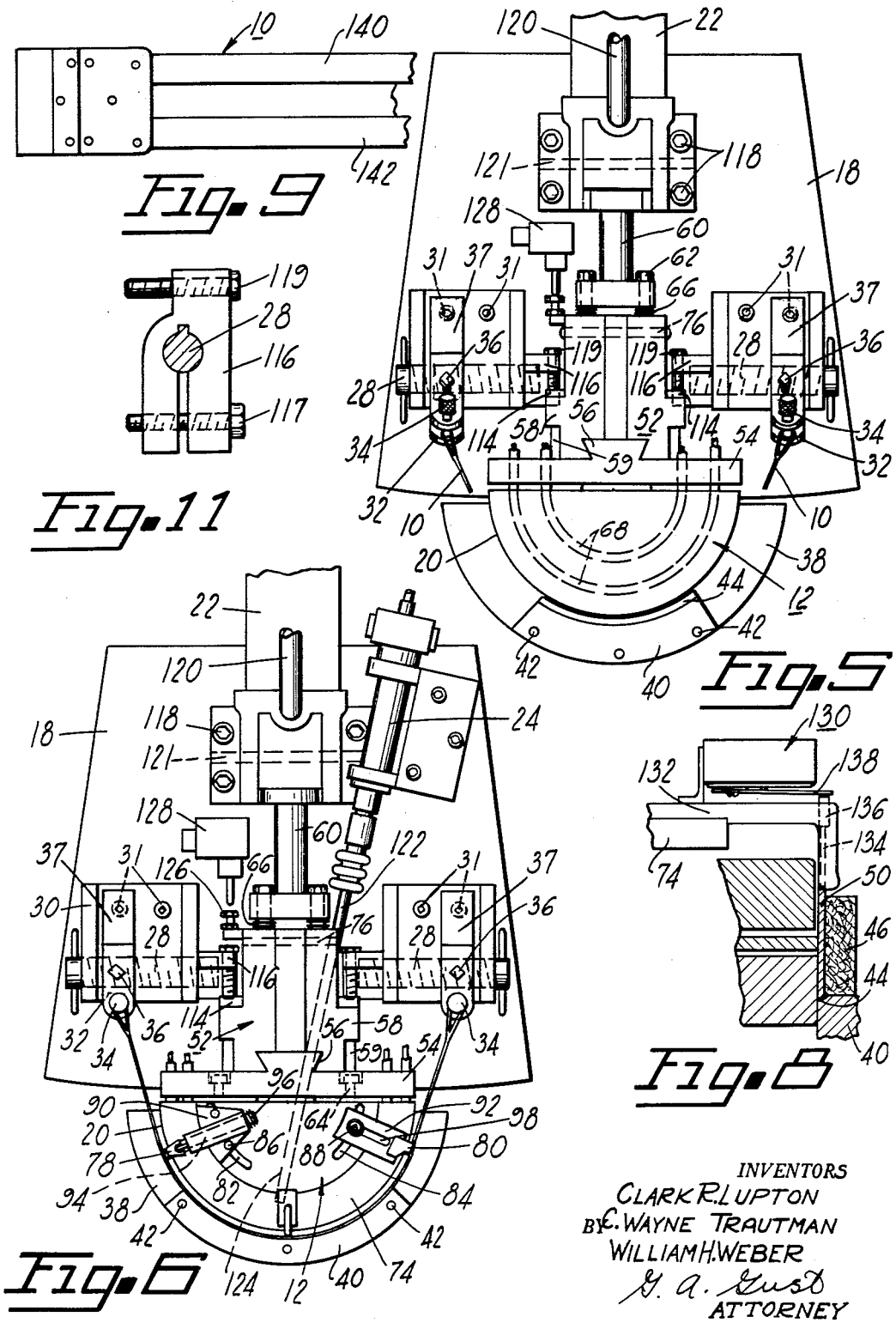

United States Patent Office 2,726,974
Patented Dec. 13, 1955

2,726,974

MACHINE FOR BONDING LINING TO A BRAKE SHOE

Clark R. Lupton, Charles Wayne Trautman, and William H. Weber, South Bend, Ind., assignors to Bendix Aviation Corporation, South Bend, Ind., a corporation of Delaware Application August 3, 1949, Serial No. 108,374

9 Claims. (Cl. 154—1)

The present invention relates to a machine or an apparatus for securing friction material to a brake element by the use of a thermo-setting adhesive and more particularly to a hydraulically operated apparatus for clamping a friction lining segment to a brake shoe under elevated pressure and temperature conditions.

The primary object of the present invention is to provide a machine capable of effectively bonding a friction lining segment having a thermo-setting adhesive on its faying surface to a brake element in a relatively short period of time.

Another object is to provide a machine which clamps a segment of adhesive coated friction lining to a brake shoe under relatively high pressure to insure good contact even though the shoe may be bent or out of radius while simultaneously raising the temperature of the adhesive to a point at which it flows and penetrates the contiguous surfaces and then causes such adhesive to cure and form a secure bond between said surfaces.

A further object is to provide a machine which will enable close control of the conditions necessary for producing a secure bond between a segment of friction lining coated on its faying surface with a thermo-setting adhesive and a brake element under mass production requirements. At the present time, one accepted method for bonding friction lining to brake elements is the "oven process" in which individual clamping fixtures are used to clamp lining segments onto respective brake elements and the assembly placed in an oven at an elevated temperature to cure the bonding adhesive. This process requires a relatively long period of time to cover a bonding cycle, it being necessary to keep the assembly in the oven until the adhesive has had time to cure. In practice, this period of time ranges upwardly from about twenty minutes. The present invention accomplishes the same bonding cycle in approximately one forty-fifth (1/45) of such time, or about thirty to sixty seconds.

This longer period of time necessitates the use of large amounts of equipment, for example, a large oven to take a sufficient quantity of brake element-lining-fixture assemblies, elaborate conveyor lines, and a large amount of floor space. These are obviously expense consuming items which the present invention obviates.

The present invention accomplishes the above objects by the use of a preheated anvil adapted to receive in close contact therewith a brake shoe or element, and a compression mechanism relatively movable with respect to said anvil and arranged to compress a segment of friction lining onto said brake shoe or element. The force of compression produces intimate contact of the lining with the shoe whereby the thermo-setting adhesive previously spread on the faying surface of the lining or shoe will be forced into the cracks and crevices of the contiguous surfaces when it reaches its flow state just prior to its polymerization or cure. The heated anvil makes possible the rapid cure of the adhesive while the above mentioned compression mechanism provides a means of obtaining intimate contact of the shoe rim with the anvil and the lining. Thus, a machine is provided, when properly adjusted, for reducing to a minimum the possibility of human error in production bonding of brake shoes which, at the present time, is considered to be a blind operation and therefore difficult to inspect.

Other objects and purposes of the present invention will appear as the description proceeds.

Figure 1 of the drawings is a diagrammatic illustration of an embodiment of the present invention;

Figure 5 is a plan view of the machine in released position with the locator plate and ejecting mechanism removed and the clamping band shown in part;

Figure 6 is a plan view of the machine in actuated position with the locator plate less its lifting mechanism and the ejecting mechanism in place and a brake shoe and lining assembly clamped together;

Figure 8 is a fragmental view showing the interlock switch in closed position;

Figure 9 is a fragmental view of the inner side of the clamping band;

Figure 11 illustrates the lever arrangement for positioning the clamping band.

As explained above, the fundamental purpose of the present invention is to provide a means for effecting quick bonding of a lining segment to a brake shoe. This is accomplished in general by sandwiching a shoe and lining assembly between two relatively movable members, one of which provides controlled heat and the other of which provides clamping pressure. One feature of novelty resides in the movement relationship between these two movable members whereby one of said members is limited to pivotal movement only while the other is limited to rectilinear movement.

Figures 1, 2:
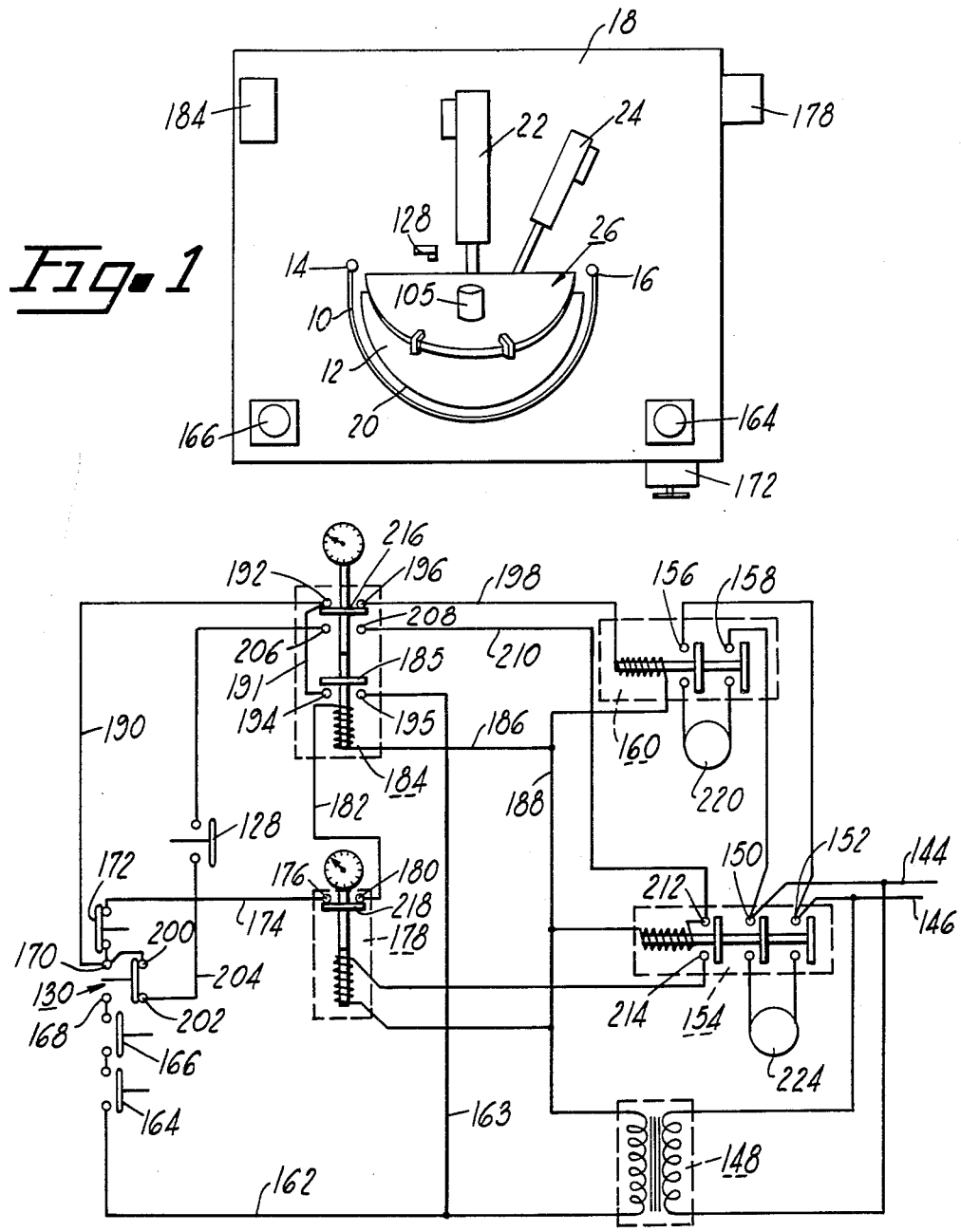
Figure 2 shows the electrical circuit diagram used in conjunction with said embodiment.

Referring now to the drawings and more particularly to Figure 1, the relatively movable members are designated by reference numerals 10 and 12, 10 in the illustrated version being a pressure equalizer in the form of a flexible metal strap or band operatively fastened at its ends 14 and 16 respectively to a base plate 18, and 12 being a heated metal block of desired configuration having in the illustrated version an arcuate shoe receiving face 20. It has been found in practice that this block should be of relatively large mass to enable the maintenance of fairly even block temperature during successive bonding operations. In the following description and claims, the block 12 will be denominated an anvil. This anvil 12 may be of any desired shape, depending upon the shape and size of the brake element upon which a lining segment is to be bonded, and in the drawings it is of part cylindrical shape.

In general, a brake shoe and lining assembly is placed between the band 10 and the surface 20 whereafter the anvil 12 is forced into the band with a predetermined pressure by any suitable means, the illustrated version utilizing a hydraulic ram cylinder arrangement 22 operatively connected to the anvil 12 to effect reciprocatory movement thereof. Once the bonding cycle has been completed, the anvil 12 is retracted and the band 10 lifts out of position, whereupon an ejecting device 24 knocks the bonded shoe and lining assembly from the fixture to ready the machine for another bonding cycle. In order to properly position the lining on a shoe, a locator plate or jig 26 is provided which centers the lining longitudinally of the shoe just prior to the compressing of the shoe and lining together.

Referring more particularly to Figure 6, the band 10 is secured to the base 18 through the intermediary of pivotal connections consisting of threaded spindles 28 journaled in support members 30 and clevises 32 threadedly received on said spindles 28. The support members are suitably fastened to base plate 18, and in the present case by means of countersunk bolts 31. Pins 34 secure the looped ends 14 and 16 of the band 10 to the respective clevis members 32. By rotating the spindles 28, the ends of band 10 may be adjusted toward or away from each other to facilitate use of different sizes of lining to be bonded onto a brake shoe. A set screw 36 is used with each clevis 32 to hold the respective strap ends in adjusted position. With this construction, band 10 is raised and lowered automatically, as explained later.

Figure 3:
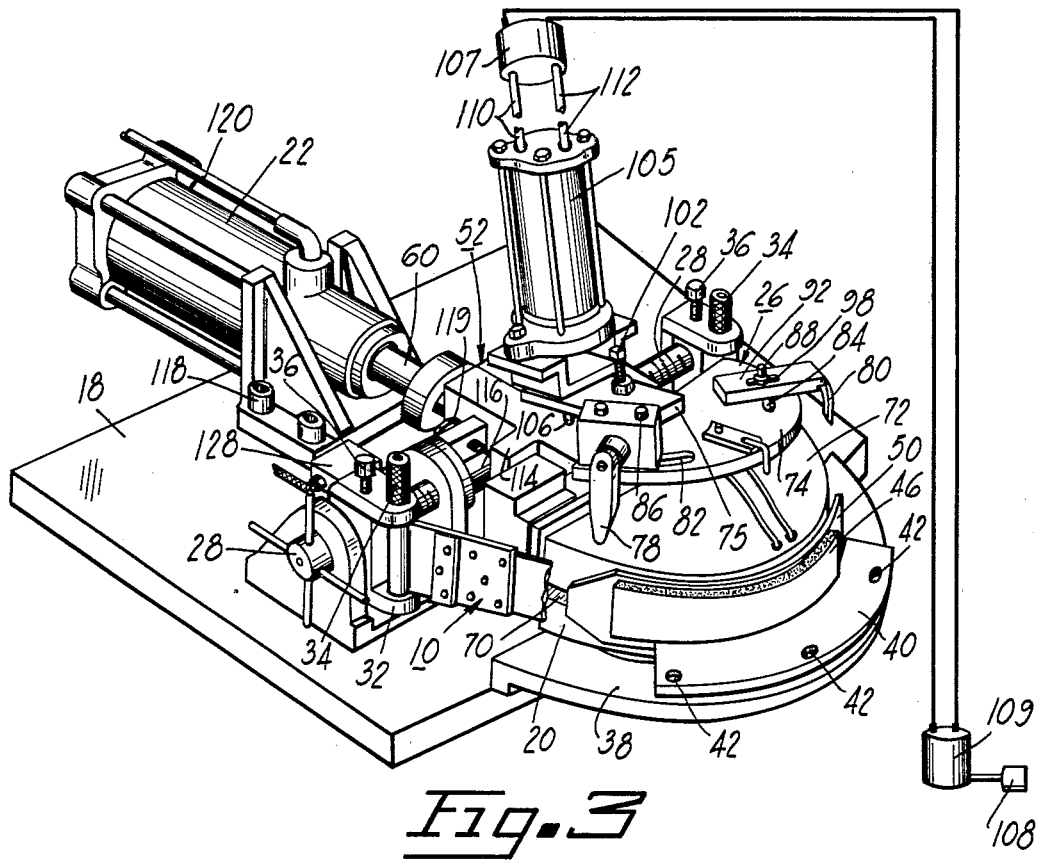
Figure 3 is a perspective illustration of the bonding machine of the present invention with a part of the actuating system shown in diagram and the clamping band shown in part.

In order to effect quick lowering of band 10 to bonding position, a leaf spring 37 (Figure 7) is suitably secured to the underside of each clevis member 32 to bear against the floor of the respective support member 30. Thus, when the clamping band 10 is in its upward or released position, the springs 37 are deformed to urge said band to its bonding position as illustrated in Figure 3.

An arcuate shoe positioning plate 38 is suitably secured (the method of securing to be explained hereinafter) in a plane parallel to the base plate 18 directly beneath anvil 12. An arcuate strip 40 is symmetrically fastened to the upper side of plate 38 by means of screws 42 and is provided with a chamfered stepped portion 44 along its inner periphery which has a width corresponding to the thickness of a brake shoe rim and a depth depending upon the desired transverse position of the lining on the shoe. In some brake shoe assemblies, the lining is narrower than the shoe rim so that a rim edge will project beyond the edge of the lining for its entire length. This positioning is illustrated in Figure 8 in which a lining segment 46 is shown in position on rim 50 with the edges of both resting on the respective portions of the arcuate strip 40.

The anvil 12 is mounted for reciprocatory movement with respect to base plate 18 and is operatively connected to the ram power cylinder 22 through the intermediary of a compression block assembly generally indicated by reference numeral 52. This assembly 52 may be regarded as a pressure transmitting member, since it serves the purpose of transmitting the pressure of cylinder 22 to anvil 12. This assembly 52 consists of an anvil fastening beam 54 provided with a centrally projecting flared tenon 56 and an oblong block 58 formed with a mortise in one end to receive said tenon 56. This same end of block 58 is provided with a flange 59 to which the shoe positioning plate 38 is secured by means of bolts 61. The other end of said block 58 is centrally fastened to piston rod 60 by means of bolts 62. According to design preference, block 58 may be guided on base 18 for translatory movement. Thus it is seen that as block assembly 52 is reciprocated, anvil 12 and shoe positioning plate 38 are carried therewith.

The anvil 12 is preferably fastened by means of bolts 64 to the beam 54 and in the illustrated version, the anvil and beam are separated by spaced washer members 66 to restrict the flow and escape of heat from the anvil into beam 54.

Figure 4:
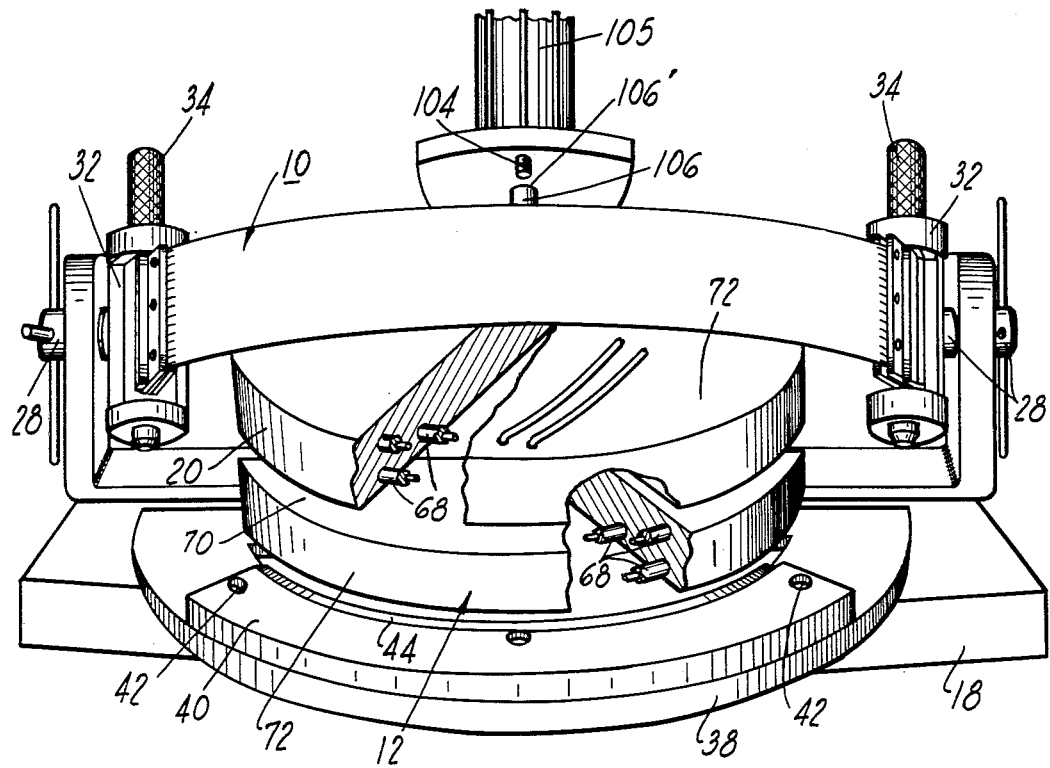
Figure 4 is a fragmental front perspective of the bonding machine in its open position showing cutaway portions of a cast anvil and the locator plate construction.

The anvil 12 may be constructed in various forms according to design preference; however, in practice it has been found that the anvil illustrated in Figure 4 provides more uniform and less expensive heating. This anvil is formed of cast iron and is shown electrically heated. Obviously, gas or other methods of heating can be utilized. Here, the electrical heating elements 68 are shown as being cast in place in the anvil body. These heating elements are similar to those used on present day electric cooking ranges with the metallic heating element being coaxially positioned inside a metallic sheath by means of an insulator such as silica dioxide. The anvil 12 of Figure 4 is cast in one piece to provide a longitudinal shoe web-receiving-slot 70 and to enclose heating elements on both sides of said slot. In Figure 5 it is seen that these heating elements are spaced apart and disposed in parallel relation with the arcuate surface 20 in order to achieve rapid and uniform heating of this surface.

Figure 7:
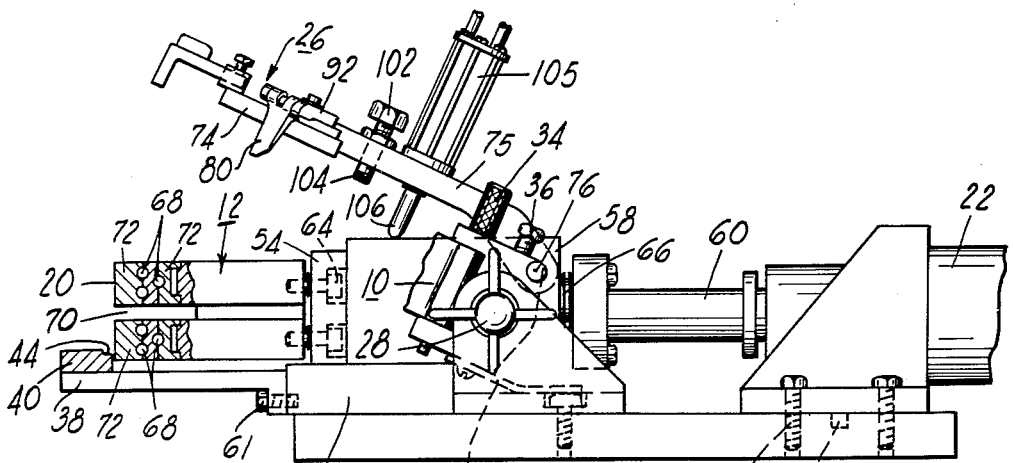
Figure 7 is a side elevation of the machine in released position with the clamping band cut away and a partial section of the anvil showing another form of anvil construction.

The anvil of Figure 7 is shown constructed of a plurality of arcuate metal segments 72 with the heating elements 68 interposed therebetween.

Figure 10:
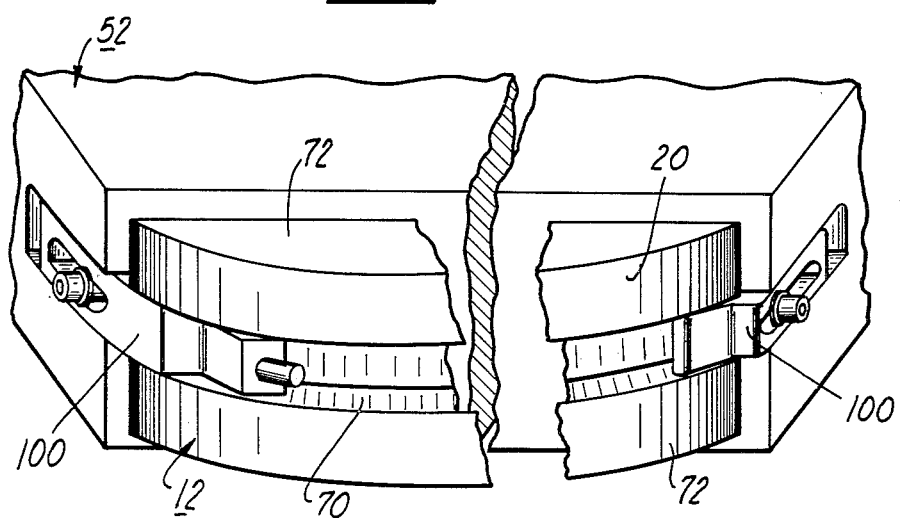
Figure 10 is a fragmental section of the anvil showing the details of the brake shoe centering construction.

Referring now to Figures 3, 6 and 7, the locator plate assembly, indicated generally by reference numeral 26, is composed of a part cylindrical plate 74 and rearwardly extending support member 75 which is hinged to block 58 by means of the transverse pin 76 to symmetrically position plate 74 over the anvil 12. This plate 74 carries a pair of circumferentially spaced lining locator fingers 78 and 80 which are adjustable circumferentially in slots 82 and 84, respectively, by means of set screws 86 and 88 passing through support members 90 and 92, respectively. Finger 78 is journaled in support member 90 by means of pin 94 and is biased in a counterclockwise direction against a stop by torsion spring 96. The finger 80 is shown adjustable circumferentially and radially of plate 74, slot 84, providing the circumferential adjustment and slot 98 the radial adjustment. By lowering this locator assembly 26 over anvil 12, the downwardly projecting fingers 78 and 80 engage the respective ends of a lining segment to position it with respect to the anvil. Adjustable shoe positioning pegs or stops 100, Figure 10, positioned in the ends of slot 70 locate the shoe with respect to the anvil, thus completing the shoe and lining longitudinal locating mechanism.

The locator plate assembly 26 is spaced from the anvil 12 by means of the screw 102 which is threadedly received in support member 75, the projecting end 104 of this screw engaging the top side of block 58.

In the illustrated embodiment of the present invention, a mechanism for operating the locator assembly 26 is shown (see Figure 7) in the form of a fluid operated cylinder 105 suitably secured to the top side of hinged support member 75 and having a reciprocable plunger 106 projecting through an aperture 106' in support member 75 (see Figure 4). The lower end of this plunger 106 normally rests on the adjacent side of block 58 as illustrated in Figures 3 and 7. In order to lower locator assembly 26 into position, the cylinder 105 is energized to draw plunger 106 thereinto, thereby allowing said assembly to fall. Other mechanisms will perform the desired function just as well, one example being an electrical solenoid. In Figure 3 is illustrated diagrammatically a method for energizing cylinder 105 in which a treadle 108 is connected to a single pole single throw normally open electrical switch 109 operatively connected to a combination electrical solenoid and pneumatic valve device 107 for regulating the flow of fluid pressure to the cylinder 105 through conduits 110 and 112. The system is so coordinated that depression of treadle 108 will lower locator assembly 26, and release of the treadle 108 will cause it to rise. Obviously, other devices may be adapted to this locator assembly 26 to perform the desired function either automatically or manually.

Projecting from each side of block 58 is a cam surface 114 which engages a lever member or tappet 116 (see Figure 11) suitably secured to the reduced inner end of each spindle 28. In the illustrated embodiment, this tappet 116 is split to facilitate clamping to spindle 28 by means of the assembly bolt 117. An adjusting member such as bolt 119 is received in the outer end of tappet 116 for determining the raised position of band 10. Upon full retractile movement of anvil 12, these cam surfaces 114 operatively engage the respective tappets 116 to rotate spindles 28 and lift band 10. The tappets 116 and the stroke of cylinder 22 are adjusted so that the band 10 will be forced down by leaf springs 37 into bonding position before the anvil 12 reaches the point where it compresses the brake shoe and lining assembly.

The ram cylinder 22 is of conventional fluid operated type and is shown secured in position on base plate 18 by means of the bolts 118 and the dovetail 121. The fluid line 120 is connected to a pressure source, not shown, by way of an electrically operated valve. The ejector device 24 (see Figure 6) is also a fluid operable electrically controlled power cylinder arrangement secured to base plate 18 by any suitable means and consists of a relatively long axially movable rod 122 which projects through a companion guide opening 124 in anvil 12 to register with the inner periphery of slot 70. After a bonding cycle has been completed and the clamping band 10 is raised out of position, the ejector device 24 is energized, causing the rod 122 to axially plunge toward the shoe and lining assembly and knock the assembly from the anvil.

An adjustable switch actuating screw 126 is secured to the rear lateral edge of block 58 to engage a microswitch 128 on base 18 upon full retractile movement of anvil 12. The purpose of this switch is explained hereinafter.

Mounted on locator plate 74 intermediate fingers 78 and 80 is a normally open interlock microswitch 130 which is connected in series with a machine actuating electrical system to prevent accidental bonding of a lining segment directly to the anvil surface. Referring to Figure 8, an arm 132 is shown secured to plate 74 to extend outwardly and downwardly in contiguity with the shoe rim 50. A bore 134 is formed in the downwardly projecting portion thereof to slidably receive a pin 136 which normally projects only a slight distance from the bottom edge thereof. This projecting distance must be less than the rim-lining edge clearance, the reason for which will become obvious after the following explanation of its operation. With a brake shoe positioned on the surface 20 of anvil 12, the upper rim edge thereof will be engaged by the lower end of pin 136 as locator plate 74 is lowered thereby moving said pin 136 upwardly. This upward motion is transmitted to the switch 130 to actuate same through the spring link 138 on the switch housing. When this switch is actuated, the machine electrical system is then capable of being energized. However, if the lining segment were inadvertently placed on the surface 20 of anvil 12, the lining being narrower than the shoe rim, pin 136 would not be contacted; consequently, the machine energizing circuit would not function.

The band 10 as illustrated in Figure 9 is preferably constructed with spaced concentrator straps 140 and 142 which engage the respective edges of a lining segment to be bonded. In the presently preferred bonding process, better operating results from bonded brake shoes can be achieved by coating only the longitudinal marginal edges of the lining segment with the thermosetting adhesive. The center portion of the lining is then without any adhesive whatsoever. The concentrator straps 140 and 142 overlie the portions of the lining which carry the adhesive to concentrate the bonding pressure where it is most effective.

Referring now to Figure 2, the electrical circuit for controlling the operation of the machine will be described. Lines 144 and 146 connect the power source to the primary winding of the transformer 148. These same lines also run to contacts 150 and 152 of relay 154 and contacts 156 and 158 of relay 160. Wire 162 leading from one side of the secondary winding of transformer 148 is connected in series with starter switches 164, 166, contacts 168, 170 of switch 130, and a stop switch 172. Wire 174 leads from stop switch 172 to a contact 176 on time delay relay 178. The other contact 180 of this relay 178 is connected by wire 182 to the coil of time delay relay 184 and thence by wires 186 and 188 to the other side of the secondary winding of transformer 148. Contact 170 of switch 130 is also connected by wire 190 to contacts 192 and 194 of time delay relay 184. Contact 196 is connected by wire 198 to the coil of relay 160, the other side of said coil being connected by line 188 to the other side of secondary winding of transformer 148. Contact 170 is further connected to contact 200 of switch 130, and the other contact 202 of this switch is connected by wire 204 in series with switch 128 and contacts 206 and 208 of time delay relay 184. Contact 208 is connected by wire 210 to contact 212 and one side of the energizing coil of relay 154. The other side of this coil is connected to line 188 and thence to the secondary winding of transformer 148. Contact 214 of relay 154 is connected in series with the energizing coil of time delay relay 178 and the line 188 running to the secondary winding of transformer 148. In representing the time delay relays, a contactor section 216 on time delay relay 184 and 218 on time delay relay 178 are shown as separate members from the armatures of the respective relays and are actuated only upon energization of the respective relay coils. Any device may be used in connection with the contactors 216 and 218 which times the actuation thereof after movement of the respective armatures.

In released position, the locator plate 74 is in its raised position as viewed in Figures 1, 3, 4, and 7; the anvil 12 is fully retracted to close switch 128 as viewed in Figure 5; and the clamping band is pivoted upwardly by anvil 12, as seen in Figures 4 and 5.

The semi-automatic electric control just described comes into operation after the shoe and lining, to be bonded, are positioned on anvil 12 and treadle 108 is operated to lower the locator assembly 26. The normally open section of switch 130 is now closed by the contact of pin 136, Figure 8, with the edge of the shoe rim 50. By depressing start buttons 164 and 166, Figures 1 and 2, time delay relay 184 and ram valve relay 160 are energized, the circuit to relay 184 being established from wire 162, through wire 174, across contactor 218, through the coil of relay 184, wire 186, and wire 188. Relay 160 is energized through the circuit from wire 162, through wire 190, across contactor 216, through wire 198, through the coil of relay 160, and back to wire 188. Time delay relay 184 being thereby energized, the instantaneous contactor 185 bridges contacts 194 and 195 to establish a hold-in circuit which by-passes start buttons 164 and 166 from wire 162, through wire 163, contactor 185, and wire 191 to contact 192. The time delayed contactor 216 is then actuated for opening of the contacts 192 and 196 and closure of contacts 206 and 208 upon the passing of a predetermined length of time. This time delay contactor may be of any conventional type known to the art.

Instantaneous relay 160 being energized during the actuation of instantaneous hold-in contactor 185, a circuit is established to the ram valve solenoid 220 from lines 144 and 146 through contacts 158 and 156, respectively. The energization of this solenoid 220 opens fluid pressure to line 120, Figure 3, of ram device 22 to press anvil 12 outwardly. While anvil 12 is thus moving, band 10 drops to centering plate 40. The shoe and lining assembly is thereby sandwiched between the anvil surface 20 and the band 10. The anvil is preheated to a temperature of approximately 650° F. and held thereby conventional thermostatic control, the heat of the anvil being transferred by conduction to the shoe and lining assembly. The bonding cycle has been found in practice to be around 40 seconds duration, this 40 seconds being controlled by the time delay contactor 216.

Upon the expiration of this 40 second period, time delay contactor 216 opens contacts 192 and 196, and closes contacts 206 and 208. Relay 160 is thereupon de-energized and ram valve solenoid 220 is actuated to retract ram device 22 and anvil 12. A circuit is now established from one side of switch 128 to contact 206, across contactor 216 to contact 208, through wire 210 to contact 212, through the coil of relay 154 to line 188. Locator plate assembly 26 is either lifted at this point or some other previous point following the shoe and lining assembly compression. This moves switch 130 to its normally open position, as shown in Figure 2. Continued movement of the anvil 12 to its fully retracted position lifts band 10 and closes switch 128, thereby energizing relay 154 completing a circuit to the eject valve solenoid 224 from line wires 144 and 146. Ejecting device 24 is then energized to effect sudden axial movement of plunger 122 to knock the bonded shoe and lining assembly from anvil 12.

Upon energization of relay 154, contacts 212 and 214 thereof are bridged to establish a circuit to time delay relay 178. This relay 178 is set for a delay of around 5 seconds to allow time for plunger 122 to complete its ejection action. Upon the expiration of this period, contactor 218 moves to break the connection between contacts 176 and 180 to de-energize relays 184, 154, and 178 in succession to ready the bonding machine for the next cycle of operation.

Although only one embodiment of the invention has been illustrated and described, various changes in the form and relative arrangements of the parts may be made to suit requirements.

We claim:

1. A machine for bonding lining to a brake shoe comprising a horizontally disposed anvil of hemi-cylindrical shape movable in line with its median radius and provided with a centrally disposed longitudinal brake-shoe-web-receiving slot in its curved portion, a shoe-positioning member carried in each end of said slot, an arcuate member movable with said curved portion having a slight depression along its edge adjacent said curved portion for receiving one edge of a brake shoe rim, said arcuate member lying in a plane below and parallel to the plane of said slot to vertically position both the brake shoe and the lining segment, an electrical heating element carried inside said anvil for uniformly heating same, a mounting plate secured on one of its sides to the flat diametrical portion of said anvil and having a centrally projecting flared tenon on its other side, a pressure transmitting block mortised to receive said tenon and adapted to reciprocate in line with the median radius of said anvil, a power cylinder connected to said pressure transmitting block to selectively reciprocate said block and anvil, a flexible steel strap mounted at each of its ends for only pivotal movement about a common axis lying in the plane of said anvil slot and in a plane parallel to said flat portion of said anvil, said strap being adapted to fit the contour of the curved portion of said anvil and further adapted to take the compressive load of said power cylinder during a bonding cycle, the ends of said strap being adjustable toward or away from each other, an operative connection between said anvil and said strap causing said strap to move out of bonding position upon retractile movement of said anvil, a brake lining locator adapted to circumferentially position a segment of lining comprising a plate of substantially the same shape as said anvil pivotally mounted to symmetrically overlie the top side of said anvil, a pair of radially and circumferentially adjustable lining-locator-fingers carried by said locator plate, each finger being adapted to engage a corresponding end of a lining segment and one of said fingers being biased to yield in a circumferential direction away from the end of a lining segment to compensate for manufacturing variations in lining segment length, means for shifting said locator into and out of its lining locating position, a shoe ejector for unloading a shoe after the completion of a bonding cycle comprising an ejector rod which lies in a plane including said anvil slot and which penetrates said anvil to register with the inner periphery of said anvil slot, an impact delivering cylinder connected to said ejector rod to selectively cause substantially instantaneous axial movement thereof, and means for automatically controlling the bonding time.

2. A machine for bonding lining to a brake shoe comprising an anvil of hemi-cylindrical shape movable in line with its median radius and provided with a centrally disposed longitudinal brake-shoe-web-receiving slot in its curved portion, an arcuate member movable with said curved portion having a slight depression along its edge adjacent said curved portion for receiving one edge of a brake shoe rim, said arcuate member lying in a plane below and parallel to the plane of said slot to vertically position both the brake shoe and the lining segment, an electrical heating element carried inside said anvil for uniformly heating same, a mounting plate secured on one of its sides to the flat diametrical portion of said anvil and having a projecting flared tenon on its other side, a pressure transmitting block mortised to receive said tenon and adapted to reciprocate in line with the median radius of said anvil, a power cylinder connected to said pressure transmitting block to selectively reciprocate said block and anvil, a flexible steel strap mounted at each of its ends for only pivotal movement about a common axis lying in the plane of said anvil slot and in a plane parallel to said flat portion of said anvil, said strap being adapted to pass around the curved portion of said anvil and further adapted to take the compressive load of said power cylinder during a bonding cycle, the ends of said strap being adjustable toward or away from each other, an operative connection between said anvil and said strap causing said strap to move out of bonding position upon retractile movement of said anvil, a brake lining locator adapted to circumferentially position a segment of lining comprising a plate of substantially the same shape as said anvil pivotally mounted to symmetrically overlie the top side of said anvil, a pair of radially and circumferentially adjustable lining-locator-fingers carried by said locator plate, means for shifting said locator into and out of its lining locating position, a shoe ejector for unloading a shoe after the completion of a bonding cycle comprising an ejector rod which lies in a plane including said anvil slot and which penetrates said anvil to register with the inner periphery of said anvil slot, an impact delivering cylinder connected to said ejector rod to selectively cause substantially instantaneous axial movement thereof.

3. A machine for bonding lining to a brake shoe comprising an anvil of hemi-cylindrical shape movable in line with its median radius and provided with a centrally disposed longitudinal brake-shoe-web-receiving slot in its curved portion, an arcuate member movable with said curved portion, said arcuate member lying in a plane below and parallel to the plane of said slot to vertically position both the brake shoe and the lining segment, an electrical heating element carried inside said anvil, a pressure transmitting member operatively secured to said anvil and arranged to reciprocate in line with the median radius of said anvil, a power cylinder connected to said pressure transmitting member to selectively reciprocate said anvil, a flexible band mounted at each of its ends for only pivotal movement about a common axis lying in the plane of said anvil slot and in a plane parallel to said flat portion of said anvil, said band being adapted to pass around the curved portion of said anvil and further adapted to take the compressive load of said power cylinder during a bonding cycle, an operative connection between said anvil and said strap causing said strap to move out of bonding position upon retractile movement of said anvil, a brake lining locator adapted to circumferentially position a segment of lining comprising a plate of substantially the same shape as said anvil pivotally mounted on said pressure transmitting member tosymmetrically overlie the top side of said anvil, a pair of radially and circumferentially adjustable lining-locator-fingers carried by said locator plate, and means for shifting said locator into and out of its lining-locating-position.

4. A machine for bonding lining to a brake shoe comprising an anvil of hemi-cylindrical shape movable in line with its median radius and provided with a centrally disposed longitudinal brake-shoe-web-receiving slot in its curved portion, an arcuate member movable with said curved portion having a slight depression along its edge adjacent said curved portion for receiving one edge of a brake shoe rim, said arcuate member lying in a plane below and parallel to the plane of said slot to vertically position both the brake shoe and the lining segment, an electrical heating element carried inside said anvil for uniformly heating same, a pressure transmitting member operatively secured to said anvil and adapted to reciprocate in line with the median radius of said anvil, a power cylinder connected to said pressure transmitting member to reciprocate said anvil, a flexible band mounted at each of its ends for only pivotal movement about a common axis, said band being adapted to pass around the curved portion of said anvil and further adapted to take the compressive load of said power cylinder during a bonding cycle, the ends of said band being adjustable toward or away from each other, and an operative connection between said anvil and said band causing said band to move out of bonding position upon retractile movement of said anvil.

5. A machine for bonding lining to a brake shoe comprising a horizontally disposed anvil of hemi-cylindrical shape movable in line with its median radius and provided with a centrally disposed longitudinal brake-shoe-web-receiving slot in its curved portion, an electrical heating element carried by said anvil for heating same, a pressure transmitting member operatively secured to said anvil, a power cylinder connected to said pressure transmitting member to selectively reciprocate said anvil, a band pivoted at each of its ends on a spindle, the axis of each of said spindles being collinear with the line of intersection of a plane including said anvil slot and a plane parallel to said flat portion of said anvil, a lever member secured to the inner end of each of said spindles, and cam surfaces on said anvil which engage said lever members to rotate said band out of bonding position upon retractile movement of said anvil.

6. A machine for bonding lining to a brake shoe comprising a horizontally disposed anvil of hemi-cylindrical shape movable in line with its median radius and provided with a centrally disposed longitudinal brake-shoe-web-receiving slot in its curved portion, an arcuate member movable with said curved portion, said arcuate member lying in a plane below and parallel to the plane of said slot to vertically position both the brake shoe and the lining segment, means for heating said anvil, means operatively connected to said anvil to reciprocate it in line with its median radius, and a flexible band mounted at each of its ends for pivotal movement about a common axis lying in a plane parallel to said anvil slot, said band being adapted to pass around the curved portion of said anvil and further adapted to take the compressive load of said means during a bonding cycle.

7. A machine for bonding friction lining to a brake shoe comprising a metallic anvil provided with a brake shoe-receiving portion, said anvil having cast therein an electrical heating element, an equalizer mounted for relative movement with respect to said anvil to operatively engage said shoe-receiving portion, a brake shoe positioning member associated with said anvil to accurately locate a brake shoe transversely of said anvil, a friction lining locator cooperatively associated with said anvil to engage a segment of lining to center it longitudinally of a brake shoe before the bonding cycle is actually begun and power mechanism for effecting the aforementioned relative movement to compress a brake shoe and lining assembly between said shoe-receiving portion and said equalizer.

8. A machine for bonding friction lining to a brake shoe comprising an anvil provided with a brake shoe-receiving portion, said anvil comprising an electrical heating element embedded in cast iron, an equalizer mounted for relative movement with respect to said anvil to operatively engage said shoe-receiving portion, a brake shoe positioning member associated with said anvil to accurately locate a brake shoe transversely of said anvil, a friction lining locator cooperatively associated with said anvil to engage a segment of lining to center it longitudinally of a brake shoe before the bonding cycle is actually begun, and power mechanism for effecting the aforementioned relative movement to compress a brake shoe and lining assembly between said shoe-receiving portion and said equalizer for a predetermined length of time.

9. A machine for bonding lining to a brake shoe comprising an anvil of hemi-cylindrical shape movable in line with its median radius and provided with a centrally disposed longitudinal brake-shoe-web-receiving slot in its curved portion, an arcuate member secured in position with respect to said curved portion and having a slight depression along its edge adjacent said curved portion for receiving one edge of a brake shoe rim, said arcuate member lying in a plane below and parallel to the plane of said slot to vertically position both the brake shoe and the lining segment, an electrical heating element carried inside said anvil for uniformly heating same, and a flexible band mounted at each of its ends for pivotal movement about a common axis, said band being adapted to be pivoted into juxtaposition with the curved portion of said anvil, said anvil and said band being relatively movable in such a manner that said curved portion and said band will compressively engage.

References Cited in the file of this patent

UNITED STATES PATENTS

| | | |
|---|---|---|
| 1,237,592 | White | Aug. 21, 1917 |
| 1,464,255 | Zimmermann | Aug. 7, 1923 |
| 1,600,672 | Janowski | Sept. 21, 1926 |
| 1,849,991 | Pioch | Mar. 15, 1932 |
| 2,022,662 | Geyser | Dec. 3, 1935 |
| 2,073,399 | Cornwell | Mar. 9, 1937 |
| 2,416,427 | Bonawit | Feb. 25, 1947 |
| 2,434,379 | Wiesner et al. | Jan. 13, 1948 |
| 2,489,496 | O'Brien | Nov. 29, 1949 |
| 2,569,737 | Spanich | Oct. 2, 1951 |